Jan. 24, 1967  A. J. VACCA  3,300,460
PROCESS FOR MIXING POLYVINYL ACETATE
WITH SAPONIFICATION CATALYST
Filed Oct. 24, 1962
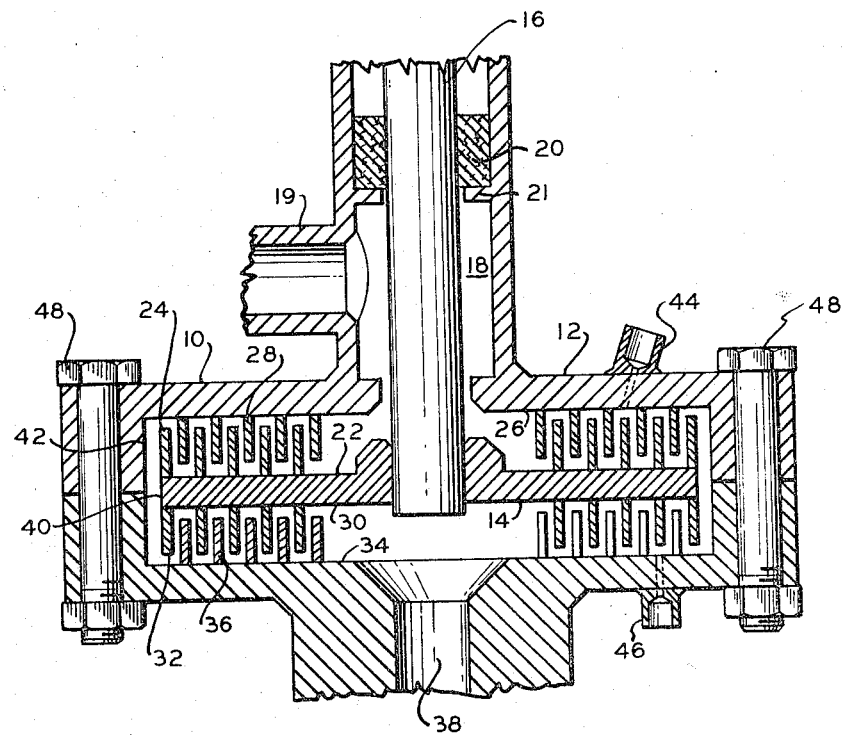
INVENTOR.
ALPHONSE J. VACCA
BY
ATTORNEY

United States Patent Office 3,300,460
Patented Jan. 24, 1967

3,300,460
PROCESS FOR MIXING POLYVINYL ACETATE
WITH SAPONIFICATION CATALYST
Alphonse J. Vacca, Somerset, N.J., assignor, by mesne assignments, to Cumberland Chemical Corporation, New York, N.Y., a corporation of Delaware
Filed Oct. 24, 1962, Ser. No. 232,708
5 Claims. (Cl. 260—89.1)

This invention relates to processes for making polyvinyl alcohol. More particularly, this invention relates to processes for mixing polyvinyl acetate with a saponification catalyst.

Polyvinyl alcohol is generally made by saponifying polyvinyl acetate in the presence of an alkaline saponification catalyst. The polyvinyl acetate, dissolved or suspended in a suitable reaction medium, is mixed with the saponification catalyst, which is also generally dissolved in a liquid medium, and the mixture is conveyed to a saponification zone where saponification to polyvinyl alcohol takes place. The polyvinyl alcohol product is then recovered.

Various techniques, reaction media, and saponification catalysts are known in the art. The lower alkanols, such as methanol, are widely used as reaction media. Strongly basic alkali metal compounds, especially the alkali metal hydroxides and alkoxides, are the preferred catalysts. Typical catalysts include sodium hydroxide, sodium methoxide, and potassium hydroxide. The alkali metal hydroxides may be dissolved in a suitable solvent such as water or a lower alkanol, and the alkali metal alkoxides may be dissolved in a lower alkanol or other suitable solvent.

For many purposes it is desirable to produce polyvinyl alcohol as a finely divided granular material. Granular polyvinyl alcohol characteristically has high bulk density and high mechanical strength, so that attrition into fines does not readily occur to any appreciable extent. Moreover, granular polyvinyl alcohol is more easily slurried or dissolved in water than polyvinyl alcohol in other physical forms having the same degree of hydrolysis.

Polyvinyl alcohol has been obtained in the form of a fibrous material in some prior art processes. Fibrous polyvinyl alcohol is less desirable for most purposes than the granular product, since the fibrous material has a lower bulk density, poorer mechanical strength, greater susceptibility to attrition, and poorer slurrying and dissolving characteristics. The problem of poor slurrying and dissolving characteristics is particularly acute in highly hydrolyzed polyvinyl alcohols having a percentage hydrolysis of 90 percent or higher. Fibrous polyvinyl alcohol which is 90 percent or more hydrolyzed does not slurry readily in cold water, and does not dissolve easily even when the water is heated.

It has been found that granular polyvinyl alcohol can be made by mixing polyvinyl acetate and saponification catalyst in a mixing zone wherein the mixture is subjected to a very high rate of shearing stress. Mixing under sufficiently high shearing stress to cause a temperature rise of at least 15° F. for a time as little as three seconds results in the production of granular polyvinyl alcohol. Surprisingly, it is possible to obtain the desired granular polyvinyl alcohol instead of the undesirable fibrous polyvinyl alcohol by mixing according to this invention, without modifying the saponification procedure or the procedure used to recover the saponification product.

In a preferred form of the invention, a stream of polyvinyl acetate, dissolved or suspended in a suitable liquid medium, is introduced into a mixing zone and directed against a rapidly rotating surface having a plurality of projections or teeth arranged in concentric circular rows. The stream is then directed radially outwardly between the rotating surface and a stationary surface which has a plurality of projections or teeth arranged in concentric circular rows which lie between the rows of teeth on the rotating surface. One wall of the housing surrounding the mixing zone constitutes the stationary surface. The stream of polyvinyl acetate then flows around the outer edge of the rotary surface and radially inwardly between a second rotary surface and a second surface of the housing, both of which have teeth arranged similarly to the teeth on the first rotary surface and first housing surface. Saponification catalyst, such as sodium hydroxide dissolved in water or methanol, or sodium methoxide dissolved in methanol, is introduced into the mixing zone and admixed with the stream of polyvinyl acetate, either as it is directed radially outwardly to the edge of the rotating surface or directed radially inwardly to the exit port leading from the mixing zone. The relative rotation of the teeth on the rotary surface with the teeth on the stationary housing produces a very high rate of shearing stress, sufficiently high to produce a temperature rise of about 15° to 40° F. in the temperature of the polyvinyl acetate solution, thus producing an intimate mixture of polyvinyl acetate and saponification catalyst which is then conveyed to the saponification zone.

This invention is of special value in the production of highly hydrolyzed polyvinyl alcohol in which the percentage hydrolysis is at least 90 percent. Highly hydrolyzed granular polyvinyl alcohol made from polyvinyl acetate mixed according to this invention is easily soluble in warm or hot water.

Any of the solvents or liquid reaction media previously used for saponification of vinyl acetate may be used in the present process. Preferred solvents are the lower alkanols containing from 1 to about 4 carbon atoms, such as methanol, ethanol, propanol, isopropanol, and the like. Methanol is especially preferred. The concentration of polyvinyl acetate in the alcohol may vary from about 5 percent to about 30 percent by weight, and solutions containing about 20 percent by weight of polyvinyl acetate have been found to be very satisfactory for mixing according to the present process folowed by saponification.

The catalyst, as previously indicated, is an alkaline substance dissolved in a suitable liquid medium. While sodium hydroxide is a preferred catalyst because of its low cost and good operating results, other catalysts, such as potassium hydroxide, sodium methoxide, may be used if desired. An alkali metal hydroxide catalyst may be dissolved in either water or lower aliphatic alcohol such as methanol. The alkali metal alkoxide catalyst may be dissolved in lower aliphatic alcohol, generally the alcohol corresponding to the particular alkoxide.

Mixing according to this invention may be carried out in various types of apparatus which are comparable to producing a very high shearing stress. The amount of shearing stress is approximately indicated by the temperature rise of the polyvinyl acetate solution or suspension. Adequate mixing is obtained when the temperature rise is at least about 15° F. The temperature rise may be greater than this, but ordinarily does not exceed about 40° F. The residence time in the mixing zone should be at least about four seconds for good mixing, although longer residence times, usually not more than about 60 seconds, are suitable. It is possible to increase the residence time above 60 seconds, but this is ordinarily not desirable since further increases in residence time do not materially improve mixing and do reduce the throughput of the mixing apparatus.

A particularly desirable mixing apparatus for carrying out the process of the present invention is that described in U.S. Patent No. 2,687,877, issued to Jensen on August 31, 1954.

This process will now be described with reference to the drawing, in which the sole figure illustrates the apparatus described more fully in the Jensen patent.

Referring now to the sole figure of the drawing, the preferred mixer 10 consists of a stationary housing 12 and a rotating disk 14 which is mounted on shaft 16 in housing 12 and driven by a high speed motor not shown. Shaft 16 is conveniently located in inlet chamber 18. Inlet conduit 19 is in communication with inlet chamber 18. Packing 20, supported by suitable means such as flange 21, surrounds shaft 16 and provides a fluid tight barrier preventing the escape of fluid from inlet chamber 18.

Rotary disk 14 has a surface 22 having plurality of teeth or projections 24 projecting upwardly therefrom and arranged in a plurality of concentric circular rows. Stationary housing 12 has a surface 26 having plurality of teeth or projections 28 projecting downwardly therefrom in concentric circular rows which lie between the rows of teeth 24 of rotary surface 14. Rotating disk 14 also has a lower surface 30 having a plurality of depending teeth or projections 32 arranged similar to teeth 24. The lower surface 34 of housing 12 has a plurality of teeth 36 projecting upwardly between the rows of teeth 32. Housing 12 has an exit port 38 for the discharge of fluid therefrom. A small clearance is provided by the outer edge 40 of rotating disk 14 and the side wall 42 of housing 12, to permit the passage of fluid around disk 14.

Housing 12 is provided with inlet openings 44 and 46 for the introduction of saponification catalyst contained in a suitable liquid solvent medium. As shown, inlet 44 is in communication with the upper or inlet portion of mixer 10, while inlet 46 is in communication with the lower or outlet portion of mixer 10.

For convenience, mixer 10 can be made in two sections which are joined together by means of bolts 48.

Polyvinyl acetate suspended or dissolved in methanol or other saponification medium is introduced into mixer 10 through inlet conduit 19, first flowing into inlet chamber 18. This solution is directed against the upper surface 22 rotating disk 14, which is revolving at a high speed, generally in the range of 1000 to 2000 r.p.m. Speeds of about 1500 have been found to be excellent for carrying out the process of this invention. The solution of polyvinyl acetate flows radially outwardly between upper surface 22 of rotating disk 14 and upper surface 26 of housing 12, passing between the teeth 24 and 28 carried on rotating disk 14 and housing 12 respectively. The solution of polyvinyl acetate then passes around edge 40 of rotating disk 14 and thence radially inwardly between lower surface 30 of rotating disk 14 and lower surface 34 of housing 12. Catalyst solution is introduced into mixer 10 through either inlet 44 or inlet 46. The catalyst solution flows concurrently with the polyvinyl acetate solution and becomes intimately mixed therewith. The mixture of polyvinyl acetate and catalyst flows through exit port 38 to the saponification zone.

Saponification may be carried out according to any desired procedure of which several are known in the art. The details of saponification do not constitute part of the present invention.

The invention will now be described in further detail with reference to the specific examples which follow.

*Example 1*

A solution of 20 percent by weight of polyvinyl acetate in methanol, having paste constituency, was introduced into a mixing apparatus of the type described in the sole figure of the drawing. This paste was introduced at the rate of 1.5 gallons a minute. The internal diameter of the mixer used was eight inches. The inlet temperature of the paste was 100° F. Also introduced into the mixer was an aqueous solution of sodium hydroxide having a concentration of 24 percent by weight. The amount of sodium hydroxide was 0.06 mols per monomer unit of polyvinyl acetate. The average residence time of the polyvinyl acetate was 6.8 seconds, and the discharge temperature was 130° F. The rotating disk in the mixer was rotated at a speed of 1500 r.p.m.

The mixture of polyvinyl acetate and catalyst was conveyed to a saponifier, where saponification to polyvinyl alcohol took place. The resulting polyvinyl alcohol was a finely divided granular material having a bulk density of about 40 lbs./cu. ft., and having high mechanical strength, and it was readily soluble in hot water.

*Example 2*

The procedure of Example 1 was repeated except that the amount of sodium hydroxide was 0.10 mol for each monomer unit of polyvinyl acetate. The speed of rotating disk 14 was 1250 r.p.m., the polyvinyl acetate inlet temperature was 85° F., and the discharge temperature was 105° F. This procedure also results in granular polyvinyl acetate having superior mechanical and dissolving properties.

While this invention has been described with reference to specific embodiments thereof, it is understood that the scope of this invention shall be measured only by the appended claims.

I claim:

1. A process for mixing polyvinyl acetate with an alkaline saponification catalyst under a high rate of shearing stress which comprises continuously introducing a stream of polyvinyl acetate in a lower alkanol solvent in a concentration of 5–30% by weight into a mixing zone, directing said stream against a rotating surface having a plurality of projections thereon in said mixing zone, passing said stream radially outwardly between said rotating surface and a stationary surface having a plurality of projections thereon and thence radially inwardly between a second rotating surface and a second stationary surface, both having projections thereon, introducing a solution of said saponification catalyst into said mixing zone, agitating the resultant mixture of polyvinyl acetate and saponification catalyst for 3 to about 60 seconds by moving said rotating surface relatively to said stationary surface generally at a rate of about 1000 to 2000 r.p.m. such that the temperature rise in said mixture in said mixing zone is 15° F. to 40° F., and withdrawing the sheared mixture resulting from said treatment of polyvinyl acetate, saponification catalyst, and lower alkanol solvent from said mixing zone.

2. A process according to claim 1 wherein the solution of saponification catalyst is introduced into the stream of polyvinyl acetate in alkanol solvent as said stream is passed radially outwardly between said first rotating surface and said first stationary surface.

3. A process according to claim 1 wherein the solution of saponification catalyst is introduced into the stream of polyvinyl acetate in alkanol solvent as said stream is passed radially inwardly between said second rotating surface and said second stationary surface.

4. A process according to claim 1 wherein said solution of saponification catalyst consists of an aqueous solution of sodium hydroxide.

5. A process according to claim 1 wherein said lower alkanol solvent is methanol.

References Cited by the Examiner

UNITED STATES PATENTS

| | | | |
|---|---|---|---|
| 2,687,877 | 8/1954 | Jensen | 259—8 |
| 2,779,752 | 1/1957 | Vining | 260—91.3 |
| 3,072,624 | 1/1963 | Akaboshi et al. | 260—91.3 |

JOSEPH L. SCHOFER, *Primary Examiner.*

J. F. McNALLY, H. WONG, *Assistant Examiners.*